United States Patent Office 2,881,159
Patented Apr. 7, 1959

2,881,159

PROCESS FOR ISOLATING SOYA PROTEIN

Sidney J. Circle, Chicago, Percy L. Julian, Oak Park, and Robert W. Whitney, Mundelein, Ill., assignors to The Glidden Company, Cleveland, Ohio, a corporation of Ohio No Drawing. Application April 2, 1956
Serial No. 575,325

13 Claims. (Cl. 260—123.5)

This invention relates to improvements in the process for the isolation of soya protein. More particularly, it relates to the isolation of soya protein in a substantially unhydrolyzed, relatively undenatured state from heat treated oil-free protein source material.

The analogy between the protein portion of the soybean and that of milk has led to concerted efforts in the devising of procedures to isolate soya protein in a state such that it will be suitable to replace milk protein, casein, in its many applications. This problem is complicated by the known sensitivity of the native soya protein system to heat, chemicals, and even mild physical treatments. Thus, soy protein isolated by even mildest treatment is believed to have properties different from those of the native protein, as present in the resting viable seed. Of course from a commercial and economic point of view, it is desirable to recover substantially all of the protein from the soybean source material and this has led to harsh isolation procedures which effect considerable denaturation of the protein molecule. While for many industrial applications the resulting denatured protein is adequate, such protein is less desirable from the nutritional standpoint. The harsh isolation procedures extract not only protein but also malodorous flavoring matter, pigmentary matter, mucilaginous or gummy matter and phytates. These non-protein materials contribute to the color and taste of the isolated protein. Further, such harsh extractive procedures destroy or at least alter the amino acids present in the native soya protein and thus affect the nutritional value of the isolated product. In the recovery of protein from soybeans on a commercial basis, it has been customary to first crack and flake the beans, and extract the oil contained in the flakes with a solvent. The extracted flakes are usually freed of the last traces of solvent by subjecting them to superheated steam or solvent. This process, we have found, causes a superficial denaturation, at least, on the surface of the extracted flakes, and as hereinafter discussed, impedes the peptization of the protein from them.

Thereafter the oil- and solvent-freed flakes are treated with aqueous solutions capable of peptizing the proteinaceous matter. It has been proposed to use relatively strong caustic soda and other relatively harsh alkaline solutions, i.e., above pH 11, for the substantially complete removal of the proteinaceous matter. The use of such harsh reagents, in our experience, has been disadvantageous commercially, due to the extensive hydrolysis caused thereby, and also because the proteinaceous material upon precipitation has been found to be slow in settling and otherwise difficult to handle in those succeeding stages of the process wherein caustic solutions are used to treat the isolated protein. For these reasons, it is the present commercial practice to extract the proteinaceous material in the pH range 9–11, with aqueous caustic soda, lime solutions, or mixed lime and dilute caustic alkali solutions. However, such milder treatments are also accompanied by several disadvantages, notably decreased yield, poor flavor and color, as well as considerable, albeit reduced, hydrolysis and denaturation.

The greater yield obtained by the use of increasingly greater concentrations of caustic alkalis either alone or in combination with other alkaline agents as the primary extractants is characterized by various disadvantages which generally more than offset the advantage of increased yield. Among the more important of these disadvantages, the following may be mentioned.

(1) Hydrolysis and excessive denaturation of the protein molecule are more difficult to control in the presence of increasing amounts of caustic alkali reagent. Although the maximum amount of protein is extractable with strong caustic, the hydrolysis and excessive denaturation which occur simultaneously with the solubilization of the protein and with increasing magnitude as the caustic concentration increases, may result in a lower net yield of isolated protein. (See Markley, "Soybeans and Soybean Products," vol. 1, chap. VIII, p. 315, Interscience Pub., 1951.)

(2) Caramelization of the naturally occurring sugars and browning reaction (so-called "Maillard Reaction") of such sugars with the protein and fragments thereof tends to be enhanced in the presence of hot caustic alkali solutions. This effect which increases in intensity with increasing concentrations of alkali results in the deterioration of the color of the resulting isolated protein.

(3) Significantly more malodorous flavoring matter, pigmentary matter, muscilaginous or gummy material and phytates are extracted by relatively strong caustic alkali than by less drastic reagents. These non-proteinaceous components naturally present in the flake source material are co-precipitated with the desired protein and accordingly result in a relatively poorer product in respect to color, taste, clarity of protein solutions, protein content and other desirable characteristics albeit greater weight yield of isolated protein product.

(4) With respect to processing difficulties arising from this caustic alkali extraction, the initially precipitated protein curd is hydrated to such an extent that the density thereof approaches that of water; this results in inordinately long settling periods, which, of course, are aggravated by increasing alkali concentrations used in the peptization.

As hereinabove referred to, the manner in which the extracted flake source material is prepared affects to a surprising extent the ease and efficiency with which the protein can be isolated therefrom. Currently, by far the major amount of soybeans is consumed in the so-called "solvent extraction" process. This means of separating the oil and phosphatide portions of the soybean from the protein portion serves also to provide the desired oil-free protein source material. The solvent extraction procedures include a step of stripping the residues to remove the last traces of solvent. This step may be a vacuum low-temperature drying, an air-drying step utilizing either hot or cold air, or a superheated steam or solvent vapor drying step.

The vacuum drying step requires a comparatively large capital investment and although it gives a protein source material of high water solubility such is not practical from the viewpoint of economy of operation.

Air drying of the extracted residue is also not commercially expedient for obvious reasons, including danger of explosion and fire.

It is known further that the flavor of the flakes is improved by subjecting them to a combination of heat and moisture, or as it is commonly called, a "debittering" process. This is conveniently done at the end of the solvent extraction step; by subjecting the oil-free residue to superheated steam or solvent, the last traces of solvent are removed as the residue is "debittered."

Inasmuch as during the "debittering" process the flakes are subjected to the agency of heat, it is inevitable that superficially at least the surfaces of the flakes are at the same time denatured. Such surface denaturation reduces the extractability of the protein in the treated material.

It has been shown by Beckel et al., Ind. Eng. Chem. 38, 731 (1946), that the water solubility of air or vacuum-dried soybean flakes (i.e., "flakes having a high water solubility") does not vary appreciably within the range of 86.0° F. and 194° F., with a slight maximum at 176.0° F. On the other hand we have found that heat treated flakes have an appreciably greater solubility range, with a limited solubility in water below about 100° F. and above about 180° F. and a maximum at about 150° F. Within this optimum temperature range of about 100° F. to about 180° F., the solubility of heat treated flakes in aqueous extractants approaches the maximum solubility of non-heat treated flakes in similar aqueous extractants at room temperature or higher. We have found further that the protein isolated from such heat treated flakes, by a procedure described hereinafter, is characterized by a bland flavor, light color and substantial freedom from hydrolysis.

Accordingly, it is an object of the present invention to provide a process for extracting soya protein from heat treated or "debittered" flakes in excellent yields and in bland-tasting substantially-unhydrolyzed condition.

It is another object of our invention to provide a novel process for the isolation of substantially-unhydrolyzed protein suitable for industrial purposes and for human consumption.

These and other objects will, in part, be obvious from and, in part, be set out in the following description of our invention.

The Cone and Brown Patent 1,955,375 discloses the treatment of soya and other seed proteins with aqueous solutions of caustic alkali, with lime or with salts. As noted above, the patent-described treatment with relatively concentrated caustic alkali has not been practical because of settling and other difficulties, and consequently the commercial practice of the Cone and Brown invention has been limited to the use of aqueous lime solutions as the peptizing agent. The latter agent according to the patent gives lower yields of isolated protein but of a more generally satisfactory product. The patent also indicates that "the lime insoluble protein cannot be readily taken up by an application of caustic soda solution," and that the lime-insoluble protein which is formed through the use of lime as a denaturing agent "can be suitably treated with caustic soda solution and be denatured to be used as a lower grade material for coating or adhesives, if desired."

It should be understood that the product of the Cone and Brown invention is a denatured product and one which is suitable only for a limited number of industrial applications.

The work of Beckel et al., referred to above, utilizes protein source material which has been subjected to a minimum of heat denaturation, if any.

Thus, the state of the art prior to our invention would lead one to the conclusion that heat treated protein source material required severe chemical treatment in order to extract therefrom a practical quantity of industrial protein, while undenatured protein source material, although amenable to mild extraction procedures, gives a product unsuitable for nutritional applications, either animal or human, because it has not been "debittered" or heat treated.

In contrast to the conclusions to be drawn from the prior art, we have now made the surprising discovery that when heat treated or "debittered" flakes are used as the protein source material and such are leached or extracted with an aqueous solution, the pH of which is within the range of about 6 to about 8, and at a temperature within the range of about 100° F. to 180° F., isolated protein of bland flavor, light color, and in substantially unhydrolyzed condition, is obtained in excellent yield. Thus by practice of our invention we have extended the utilization of the usual commercial type "debittered" oil-free soya flakes to the preparation in high yields of high grade substantially unhydrolyzed protein of bland flavor and light color.

The protein obtained in our novel process is substantially unhydrolyzed since it has not been subjected to the deleterious effects of strong alkalies. We found further that the recovery of total protein from the heat treated source material was increased not only by limiting the losses due to hydrolysis but also by recovering from the protein source material a substantial amount of the albuminous protein usually lost in the whey. The albuminous protein is, in the presence of caustic alkali, solubilized and not precipitated at the isoelectric point of the globular protein. It is, however, coagulated by heat and rendered recoverable with the spent residual flakes. We have found that temperatures above about 130° F. effect the recovery of increasing amounts of the albuminous protein, whereas at temperatures in excess of about 180° F. the heat denaturation of the globular protein increases inordinately. Within the pH range of about 6 to about 8, we have found it practical to carry out the extraction between about 130° F. and about 160° F.; we prefer to operate at the lower temperatures with the higher pH of extractant and especially we prefer to carry out our novel process at 140° F. and at a pH of 7, in order to obtain the maximum yield of high quality vegetable protein in substantially unhydrolyzed condition.

Our discovery, however, is not limited to the extraction of heat treated, i.e., "debittered"—soya protein source material with water at between about 100° F. and about 180° F. We have found that other aqueous extractants such as dilute lime, alkali metal and ammonium hydroxides, alkali metal and ammonium phosphate, alkali metal and ammonium carbonates, alkali metal and ammonium halides, and the like can be used as well within the pH range of about 6 to about 8. In each instance we have found that the yield and quality of protein isolated from heat treated protein source material is excellent and within the requirements of a practical commercial procedure. Further, it is pointed out that the yield of protein can be increased by treatment of the extracted protein source material with aqueous caustic alkali solutions in the manner disclosed and claimed in co-pending application of Circle, Julian and Whitney, Serial No. 406,082, filed January 25, 1954, now abandoned, of which this application is a continuation in part. The quality of the protein isolated from the "spent" source material is excellent for most industrial applications, but its color and flavor, because it has been extracted by a relatively harsh reagent, are less suited for use in compositions intended for human consumption.

The following examples illustrate the foregoing discoveries and advantages. They represent the best ways presently known to us for utilizing the principles of our invention. Parts are by weight and temperatures are expressed in degrees Fahrenheit.

*Example 1*

A mixture composed of 100 parts of solvent-extracted soybean flakes, containing 11% moisture and which have been prepared by a process including the step of removing the last traces of extraction solvent from the flakes by treatment with superheated steam, and 1400 parts of water was agitated for 1.55 hours at 140°. The slurry was filtered over screens to give 1200 parts of aqueous liquor. The residual flakes were washed by being reslurried for ten minutes at 80° in 1200 parts of water.

The slurry was filtered over screens to yield 1200 parts of reslurry liquor and the spent flakes were pressed to yield 100 parts of press liquor. The pressed spent flakes were dried and amounted to 38 parts at 12% moisture. The combined reslurry and press liquors (1300 parts) were added to the aqueous liquor (1200 parts) and the entire mass, after being clarified by centrifuging, was rendered acid to a pH of 4.6 by the addition of aqueous hydrochloric acid, whereupon a proteinaceous curd was precipitated. The curd, thereby obtained, was permitted to settle and thereafter the whey (1700 parts) was decanted therefrom. The wet curd was washed by reslurrying it in 1700 parts of hot (150°) water, after which the wet curd was separated by filtration. The curd was dried to give 32 parts of substantially unhydrolyzed bland-tasting isolated protein of light color at about 10% moisture.

Comparable results were obtained when the soybean flakes were extracted with aqueous ammonium hydroxide at pH 7, with aqueous caustic soda at pH 7.5, or with aqueous lime in amount sufficient to give a pH of 8 in the extracting liquor.

Example 2

A mixture composed of 100 parts of extracted heat treated flakes and 1400 parts of water was agitated for 1.5 hours at 140°. The slurry was filtered by screening to yield 1200 parts of aqueous liquor. The flakes were reslurried in 1200 parts of water containing two parts of sodium hydroxide for ten minutes at 80°. The mixture was filtered over screens to give 1200 parts of caustic reslurry liquor (to which was added 100 parts of alkali press liquor obtained by pressing the flakes). The pressed flakes were dried yielding 30 parts of dry spent flakes.

To the aqueous liquor (initial extract) was added hydrochloric acid in an amount sufficient to adjust the pH to 4.6. The resultant slurry was permitted to settle, the supernatant liquor was decanted, the residual curd washed with 1400 parts of hot (120°) water and the curd was separated by filtration. The wet curd was dried to give 25 parts of bland unhydrolyzed protein. The caustic reslurry liquor was clarified by centrifuging and the clear liquor was neutralized and acidified to a pH of 4.6 by the addition of $SO_2$.

Example 3

A mixture consisting of 100 parts of oil-free "debittered" soybean flakes (containing 11% moisture), 1400 parts of hot (130°) water and 0.15 parts of ammonium hydroxide (28%) were agitated for one hour. The mixture was screened and the extracted flakes after separation from the main liquor (1200 parts) were reslurried for one hour in 1200 parts of warm (80°) water. The reslurry mixture was screened and pressed to yield 1200 parts of reslurry liquor and 100 parts of press liquor. The spent flakes were dried to 12% moisture and weighed 36 parts.

The main, reslurry and press liquors, obtained above were combined and after centrifuging, were rendered acid to a pH of 4.6 by the addition of sulfur dioxide. The resultant curd was permitted to settle, the supernatant whey decanted and replaced with a like volume of hot (120° C.) water to wash the settled curd. Thereafter the curd was filtered and the filter cake dried to 10% moisture content. Thusly, 30 parts of substantially unhydrolyzed isolated soybean protein, light in color, were obtained.

This procedure was repeated using 0.6% on the weight of the flakes of aqueous caustic soda instead of the dilute ammonium hydroxide as the initial extractant. The pH of this medium was 8.0 The precipitating acid used was HCl. The product was likewise bland in flavor, light in color and produced in excellent yield.

Example 4

In an analogous manner to that described in Example 3 above, soybean flakes were extracted with hot (130°) dilute ammonium hydroxide and then screened from the main liquor. This liquor was clarified and precipitated with HCl to form a substantially unhydrolyzed protein curd, which was dried. The wet flakes instead of being reslurried in water, were subjected to extraction treatment in 800 parts of warm (75°) water in the presence of 2.25 parts of caustic soda and a like amount of hydrated lime. After one hour, the slurry was screened and the spent flakes were reslurried in 800 parts of hot (145°) water for ten minutes. After screening, the alkaline extraction liquor was combined with the reslurry liquor as well as liquor obtained by pressing the spent flakes and the mixture (1700 parts) was subjected to protein hydrolysis at 120° for 3.5 hours in the presence of 3.22 parts of sodium carbonate. The hydrolyzed liquor was clarified, precipitated by addition of acid ($SO_2$) to the isoelectric point and the hydrolyzed protein was isolated in a known manner.

This example illustrates the combination of steps leading to an unhydrolyzed protein and a hydrolyzed protein. The unhydrolyzed isolated soya protein is obtained in a bland, light colored form suitable for edible and certain industrial purposes requiring extraordinary water resistant properties, whereas the hydrolyzed isolated protein is obtained in a form suitable for industrial uses such as paper coating adhesive, ingredients for water base paints, and the like.

Example 5

A mixture of 100 parts of solvent-extracted heat treated soybean flakes containing 8.3% Kjeldahl nitrogen in 1400 parts of water was agitated at the temperature indicated below for one hour. Thereafter the slurry was screened to obtain an aqueous liquor. The liquor was clarified by centrifuging and the clarified liquor was analyzed for its nitrogen content by Kjeldahl procedure. For this determination, the liquors were adjusted to 1400 parts and a 10 cc. aliquot was submitted for analysis. The percent N extracted was calculated as follows:

$$\text{Percent N extracted} = \frac{14 \times \text{percent N in extract} \times 100}{8.3}$$

The data obtained at various temperatures is given in the following table:

| T° | Percent N Extracted |
|---|---|
| 75 | 34.0 |
| 85 | 44.6 |
| 95 | 50.6 |
| 105 | 50.6 |
| 115 | 57.5 |
| 125 | 63.0 |
| 135 | 63.3 |
| 145 | 67.3 |
| 150 | 69.2 |
| 160 | 65.5 |
| 165 | 59.5 |
| 175 | 50.9 |
| 185 | 50.9 |

The above examples are illustrative of the utilization of "debittered," i.e., heat treated flakes as a source of unhydrolyzed isolated protein. Inasmuch as this type of protein source material respresents by far the major source of isolated soya protein, our invention becomes of significance in its economic and commercial importance for it provides an effective means of isolating substantially unhydrolyzed soya protein suitable for edible as well as industrial utilization from commercially available heat treated source material.

Considerable variation in the manner of carrying out the extraction of these commercial type "debittered" flakes is possible and, hence, it is pointed out that the above examples are illustrative rather than limiting in nature and intent. For example, the concentration of alkali extractant can be varied over a considerable range from nil to such amount as will produce a pH in the extraction liquor of about 8. The increment of yield from our mild extraction procedure will vary directly with the concentration of alkali (time and temperature being held constant), whereas the quality, i. e., the color, flavor, and nutritional value, will vary inversely with the alkalinity of the extraction media. These differences will be small, though of importance, on an industrial scale.

As illustrated in Example 5 above, the temperature of the extraction step is of importance. In contrast to the findings reported in the prior art when using protein source material which has undergone little or no heat treatment and from which the yield of protein extracted varies but slightly with temperature, we have shown that from "debittered flakes," the yield of protein extracted in substantially unhydrolyzed condition increases to a maximum at about 150° F. and thereafter, due probably to heat denaturation, diminishes. This unobvious finding has led to the development of our preferred conditions and procedure for obtaining substantially unhydrolyzed bland tasting soya protein.

The unexpected improvements in the art of extracting soya protein are applicable to processes carried out batchwise or continuously.

Moreover, as indicated in Example 4 above, a combination of procedures will be obvious to those skilled in the art.

Having described our invention, what we claim is:

1. The process for preparing bland substantially unhydrolyzed isolated soybean protein which comprises subjecting heat treated, superficially denatured, commercial, solvent extracted, soybean protein source material to an extraction in an aqueous solvent at a pH of between about 6 and about 8 and at a temperature between about 100° F. and 180° F.

2. The process as claimed in claim 1 wherein said aqueous solvent contains sodium hydroxide, and wherein the protein source material is in the form of flakes.

3. The process as claimed in claim 2 wherein the temperature of the extraction is between 130° F. and 160° F.

4. The process as claimed in claim 1 wherein said aqueous solvent contains ammonium hydroxide, and wherein the protein source material is in the form of flakes.

5. The process as claimed in claim 4 wherein the temperature of the extraction is between 130° F. and 160° F.

6. The process as claimed in claim 1 wherein the temperature of the extraction is between 130° F. and 160° F.

7. The process as claimed in claim 1 wherein the extraction is effected at a pH of about 7 and at a temperature of about 140° F., and wherein the protein source material is in the form of flakes.

8. The process as claimed in claim 1 wherein said aqueous solvent contains sodium carbonate, and wherein the protein source material is in the form of flakes.

9. The process as claimed in claim 8 wherein the temperature of the extraction is between 130° F. and 160° F.

10. The process as claimed in claim 1 wherein said aqueous solvent contains lime, and wherein the protein source material is in the form of flakes.

11. The process as claimed in claim 10 wherein the temperature of the extraction is between 130° F. and 160° F.

12. The process for extracting heat treated, commercial, solvent-extracted soybean protein source material which comprises the steps of subjecting the protein source material to an initial extraction in an aqueous solvent at a pH within the range of about 6 to 8 and at a temperature between about 100° F. to about 180° F. and thereafter subjecting the extracted protein source material to a subsequent extraction in an aqueous alkaline solvent at a pH at least about 9 and at a temperature of at least about 75° F.

13. The process as claimed in claim 12 wherein the protein source material is in the form of flakes.

References Cited in the file of this patent

UNITED STATES PATENTS

| | | |
|---|---|---|
| 1,955,375 | Cone et al. | Apr. 17, 1934 |
| 2,198,538 | Kajita et al. | Apr. 23, 1940 |
| 2,274,983 | Hieronymus | Mar. 3, 1942 |
| 2,377,853 | Boyer et al. | June 12, 1945 |
| 2,451,659 | Calvert | Oct. 19, 1948 |
| 2,543,467 | Renner | Feb. 27, 1951 |
| 2,549,526 | Rowe | Apr. 17, 1951 |
| 2,589,867 | Rowe | Mar. 18, 1952 |

OTHER REFERENCES

Iinuma: J. Soc. Chem. Ind., Japan, vol. 36, Suppl. Binding (1933), pp. 310B, 311B.

UNITED STATES PATENT OFFICE
CERTIFICATE OF CORRECTION

Patent No. 2,881,159                                                     April 7, 1959

Sidney J. Circle et al.

It is hereby certified that error appears in the printed specification of the above numbered patent requiring correction and that the said Letters Patent should read as corrected below.

Column 3, line 47, after "but" strike out "of"; column 4, line 49, for "by treatment" read -- by subsequent treatment --; column 6, line 63, for "means of" read -- means for --; column 7, line 19, after "The" insert -- foregoing --.

Signed and sealed this 1st day of September 1959.

(SEAL)
Attest:

KARL H. AXLINE                                                        ROBERT C. WATSON

Attesting Officer                                                Commissioner of Patents